Dec. 28, 1965
H. J. HABIGHORST
3,226,088
APPARATUS FOR PULLING CABLE
THROUGH UNDERGROUND CONDUIT
Filed July 16, 1963
2 Sheets-Sheet 1
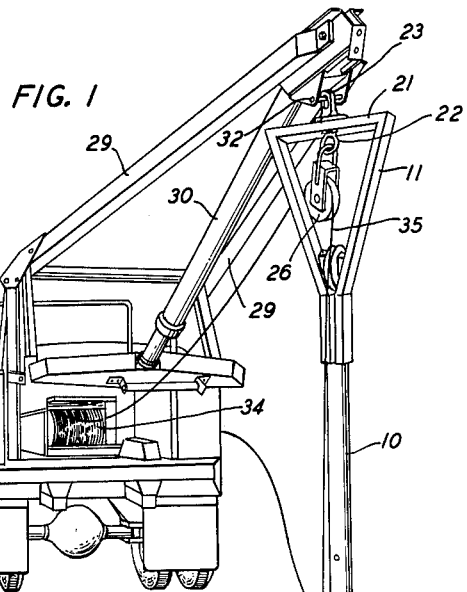
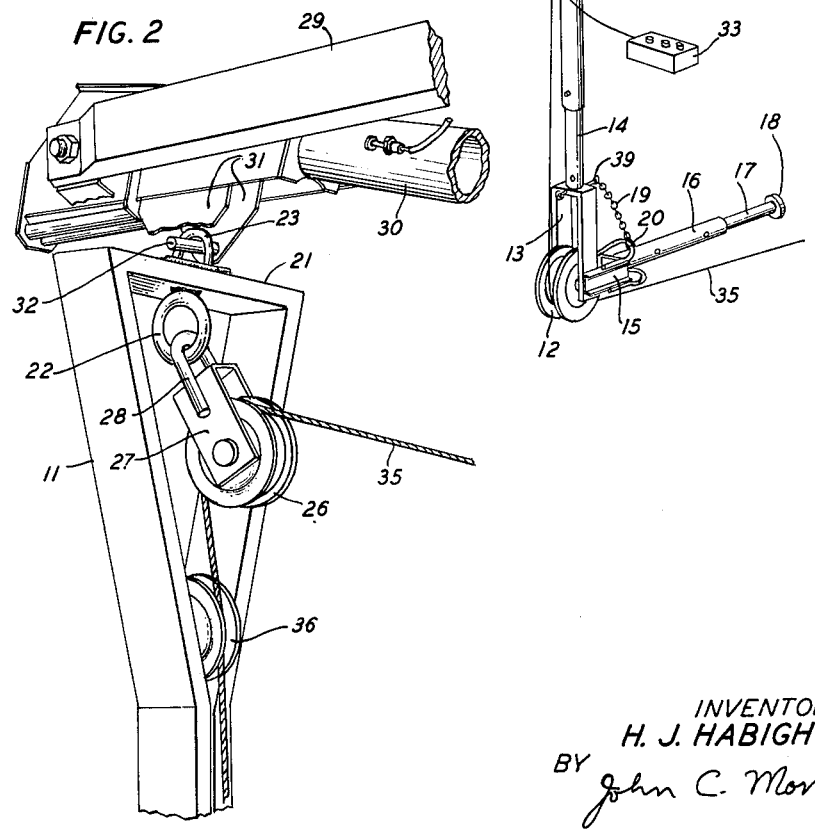
INVENTOR
H. J. HABIGHORST
BY John C. Morris
ATTORNEY

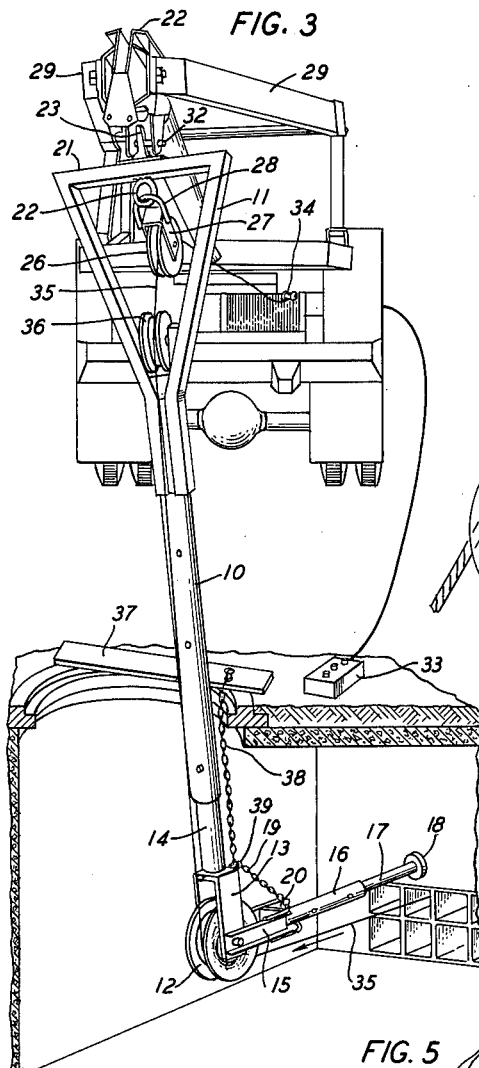
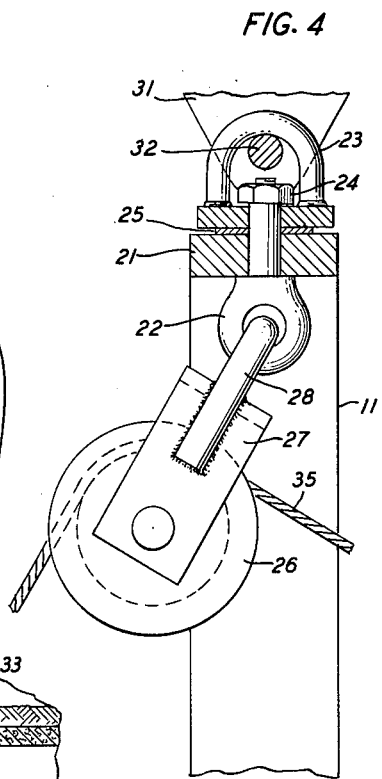
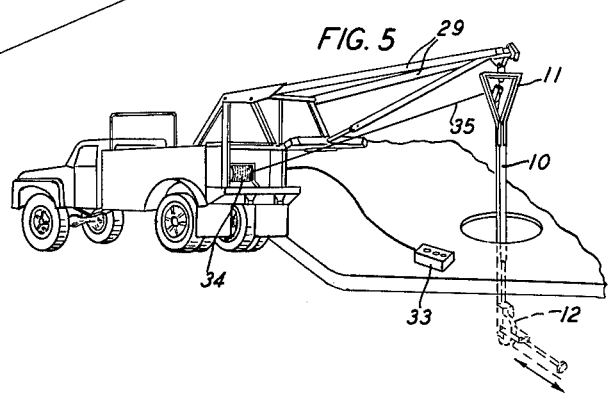

United States Patent Office 3,226,088
Patented Dec. 28, 1965

3,226,088
APPARATUS FOR PULLING CABLE THROUGH UNDERGROUND CONDUIT
Henry J. Habighorst, Phoenix, Ariz., assignor to American Telephone and Telegraph Company, New York, N.Y., a corporation of New York
Filed July 16, 1963, Ser. No. 295,404
12 Claims. (Cl. 254—134.3)

This invention relates to equipment for placing electrical cable in underground conduit and more specifically to a frame for pulling electrical cable through underground conduit.

The increase in underground electrical facilities has necessitated the development of new equipment to provide for the economically and physically efficient placement of underground cable. In order to meet these requirements, the equipment must be rugged to withstand large forces and stresses encountered under heavy pulling conditions, simple and easy to operate so that pulling crews may be reduced to a minimum number, yet mobile so that the equipment may be readily transported from one work location to another. Truck-mounted derricks and frames provide the flexibility needed to meet the above requirements in that they may be made heavy enough to withstand the forces in pulling long lengths of large diameter cable, yet may be transported by merely moving the truck.

Normal pulling operations may be complicated by the physical relationship to each other of the duct openings, direction of the duct run, manhole opening and placement of the truck. These physical measurements, including such others as the depth of manhole, size and shape of the latter, and depth of the duct opening with respect to the manhole opening, cooperate to increase the problem of placing cable underground.

Pulling frames included in the prior art have solved some of these problems but not all of them in one frame. The frames of the prior art generally include a derrick at the apex of which is mounted a winch line pulley. Extending from the pulley is an extendable shaft having at its other extremity a large diameter sheave. The sheave end of the frame is provided with means for securing it in a predetermined position in the manhole.

The disadvantage of such a frame may be exemplified by describing a typical pulling operation with this type of equipment. Such an operation is initiated by aligning the truck with a manhole opening and if possible the direction of the duct run. It is relatively important that the truck be aligned with the manhole opening and in order to accomplish this a second man is required to guide the driver in positioning his truck, or, at best, the driver must mount and dismount to insure his own position. If the truck is then not aligned with the direction of the duct run or if such alignment cannot be obtained because of curbs, walls, trees or other obstructions, it is known to rotatably mount the sheave end of the frame with respect to the shaft so that the misalignment of the truck with the direction of the duct run may be corrected. This alignment is critical in order to insure a straight pull since a straight pull is accomplished with minimum pulling forces. However, such a rotation winds the winch line around the frame shaft, thereby causing friction between the winch line and the shaft. This friction increases the pulling forces necessary for the pulling operation. In addition the rotation also causes the winch line to rub against the side walls of the winch line pulley and the sheave. The rubbing also increases friction and subsequently the pulling forces and reduces the life of the winch line because of the wear caused by the rubbing.

Frames of this type do not provide for alignment with a duct opening that is not aligned with the manhole opening. If such a condition exists, the cable must be pulled without a straight pull condition. As mentioned before, the pulling forces are increased and if the misalignment is great may result in damage to the winch line, the duct, or even the electrical cable that is being inserted in the duct.

It is an object of this invention to improve the equipment available for the placing of cable in underground conduit.

Another object of the invention is to simplify the structure of pulling frames so that the number of men required to operate such a frame may be reduced to one.

Another object of the invention is to mount a frame upon a truck so that the frame may be aligned simply and efficiently with a duct opening irrespective of the location of the duct with respect to the manhole opening or the placement of the truck.

A still further object of the invention is to mount a frame upon a truck so that the frame may be aligned with a duct opening, regardless of the positioning of the duct opening, without causing the winch line to rub against the shaft or the sides of the winch line pulley or sheave.

A specific object of the invention is to ease the requirement of aligning the truck with the manhole opening and the duct without causing subsequent complications in the pulling operation.

The invention contemplates a truck having mounted on the rear thereof a remotely controllable hydraulically operated derrick and a winch of sufficient mechanical ability to provide the pulling forces required for pulling long lengths of large diameter cable in underground conduit. Attached to the derrick is a pulling frame having a triangular yoke at one end of an extendable shaft and a large sheave at the other. The sheave end of the frame also includes means for securing that end in a predetermined relationship in the manhole. The yoke end is rotatably and pendulously attached to the derrick. Within the yoke a winch line pulley is also rotatably and pendulously mounted with respect to the yoke by the same means that rotatably and pendulously attaches the frame to the derrick. The result is that the frame may be rotated to align with a duct opening in a manhole, regardless of the placement of the truck. Because the entire frame can rotate around its mounting to the derrick, the winch line does not wind itself around the frame shaft. It may also swing similar to a pendulum to correct for any misalignment of the duct opening with respect to the manhole opening.

The mounting of the winch line pulley allows the pulley to rotate with respect to the frame yoke and align itself with the winch line extending from the winch in the truck and to swing with respect to the frame so that the winch line extending from the manhole will not rub against the frame shaft or against the side walls of either the sheave or pulley. Such an arrangement provides for a straight pull for all conditions encountered in a pulling operation.

The advantages of the invention are obvious. By pendulously mounting the frame to the derrick, any misalignment of the duct opening and the truck positioning with respect to the manhole opening can be corrected by swinging the frame with respect to the derrick to compensate for the misalignment. If the truck is not parked in the same direction as the direction of the duct run, the entire frame may be rotated to provide for a straight pull without winding the winch line around the frame shaft and thereby causing wear and increased pulling forces. The mounting of the winch line pulley allows it, after the frame has been correctly positioned, to swing and rotate with respect to the yoke and align itself with the winch line extending from the manhole and truck.

The above-mentioned advantages are obtained from the invention's features, one of which is a pulling frame that is pendulously and rotatably mounted with respect to a hydraulic truck mounted derrick.

Another feature of the invention is the inclusion in a pulling frame of a pendulously and rotatably mounted winch line pulley that may move with respect to the frame, regardless of the movement of the frame with respect to the derrick.

Another feature of the invention is the mobility and simplicity of a rugged pulling frame, allowing one-man operation in inserting long lengths of large diameter cable in underground conduits.

A still further feature of the invention is a truck mounted pulling frame that eases the requirements of positioning the frame with respect to a manhole by providing means to correct for truck misalignment.

Other objects, advantages and features of the invention will be obvious and understood from the following detailed description when read in conjunction with the drawing, in which:

FIG. 1 is a view showing the frame attached to the hydraulic derrick of the truck;

FIG. 2 is a perspective view showing the mounting of the frame to the derrick;

FIG. 3 is a perspective view showing the frame in a corrective position in a manhole;

FIG. 4 is a sectional view showing in detail the mounting of the frame to the derrick and the winch line pulley to the frame; and FIG. 5 is a perspective view showing the frame in another corrective position in a manhole.

According to the preferred embodiment of the invention the frame is comprised of a main shaft 10 having a triangular yoke 11 on one end and a large sheave 12 on the other. The sheave 12 is journaled between the two arms of a fork 13 which is attached to a telescoping extending portion 14 of the main shaft 10. The extending portion 14 is tubular in shape and has an outside diameter of a dimension that will fit within the inside diameter of the main shaft 10. Both the shaft 10 and the portion 14 are appropriately drilled so that they can be bolted solidly together in a number of various positions. Thus the over-all length of the frame may be increased or decreased by sliding the portion 14 within the shaft 10 and bolting them in the desired position.

As shown in the various figures, the sheave end of the frame also includes means for fixing or securing it in a fixed relationship within a manhole. Journaled to the same axle upon which the sheave is mounted is a U-shaped fork 15 having a prop 16 extending therefrom. The prop 16 is comprised, in this instance, of an extendable shaft 17 and a foot 18. The length of the prop 16 may be extended in a manner similar to that of the frame shaft 10 by sliding and fixing the shaft 17 within the prop 16. A chain 19, its associated loop 20 and anchor 39 hold the prop 16 in its desired position. The operation of these elements will subsequently be explained. Although the frame has been disclosed with a prop 16 to secure the sheave end of the frame within the manhole, it is obvious that other well-known means such as chain mounts are also contemplated; such mounts, for example, may comprise a chain extending from the anchor 39 to a ring in the manhole wall.

The yoke 11 of the frame is triangular in shape having a generally horizontal top bar 21 that closes the other two arms of the yoke 11. An eye bolt 22 (see FIG. 4) extends through the bar 21 with the eye or circular part inside the arms of the yoke 11. On the outer side of the yoke 11 a ringed washer 23 is rotatably secured under a nut 24 that screws onto the other end of the bolt 22. A washer 25 may be interposed between the ringed washer 23 and the bar 21, or sufficient end play provided between the bar 21 and the ringed washer 23 to allow free movements of the assembly. When the various parts have been so assembled, the bolt 22 may rotate with respect to the bar 21 and consequently with respect to the rest of the frame and with respect to the ringed washer 23. In other terms, the motion may be described that the bar 21, and consequently the frame, may rotate with respect to the ringed washer 23 or the bolt 22 and the bolt 22 acting like an axle or journal may rotate with respect to the bar 21 and the ringed washer 23. All rotation of the various parts is independent of each other.

A winch line pulley 26 is pendulously attached to the eye of the bolt 22. The pulley 26 is journaled between the arms of a U-shaped yoke 27. The yoke 27 has attached thereto a loop 28 which extends through the eye of the bolt 22. There is sufficient disparity in the size of the eye and the shape and diameter of the material of the loop 28 to allow the yoke 27 and pulley 26 to swing similar to a pendulum about its mounting. Because the bolt 22 may rotate with respect to the bar 21 it is obvious that the pulley 26 may swing like a pendulum and rotate with respect to the frame.

In addition to the winch line pulley 26, a guide pulley or idler 36 is also mounted within the arms of the triangular yoke 11. The idler 36 is mounted within the arms of the yoke 11 at that point where the yoke 11 is attached to the shaft 10. The function of the idler 36 is to guide the winch line 35 between the sheave 12 and the winch line pulley 26.

The frame is attached at the yoke end to a hydraulically operated truck mounted derrick. The derrick illustrated includes two arms 29 which are joined at one end in a V-shape. A hydraulic cylinder 30 works against the joint where the two arms 29 meet. On the under side of the joint, are two flanges 31 that extend from the joint parallel to the cylinder 30 and in a direction toward the ground. An axle 32 extends between the two flanges 31 and through the ring of the ringed washer 23. The frame is thus attached to the derrick. As previously described, there is sufficient disparity in the diameter of the material and the size of the ring to allow the frame to swing similar to a pendulum with respect to the derrick. Since the bar 21 may rotate with respect to the ringed washer 23, it is obvious that the frame may swing like a pendulum and rotate with respect to the derrick.

The invention may further be disclosed and understood by describing its operation. When the frame is in transit, the derrick is folded over the cab of the truck along with the frame. The truck is then parked adjacent the manhole opening through which the frame is to work. The derrick is unfolded and the frame readied for insertion as shown in FIG. 1. The truck need not be, although it may be, parked in the same direction as the direction of the duct run; neither need the truck be exactly aligned with the opening of the manhole. The operator then approaches the manhole opening bringing with him the remote control box 33. With the box, the operator may control the elevation of the derrick and with other similar controls, not shown, the winch 34 in the back of the truck. The frame is then lowered into the manhole using the remote controls. The elevation of the frame may be adjusted by moving the derrick up and down or by extending the main shaft 10 of the frame.

If the duct opening is not aligned with the manhole opening or if the truck is not exactly aligned with the manhole opening, the frame may be swung, as shown in FIG. 3, to correct the misalignment. In addition, the frame may be rotated as shown in FIGS. 3 and 4 to align with the direction of the duct run and allow for a straight pull condition.

Under certain pulling conditions the forces encountered in the operation may tend to pull the frame down into the manhole. To prevent this a manhole opening brace 37 may be placed over the manhole opening. A chain 38 is then attached to an anchor 39 of the frame and to the brace 37 to prevent the frame from being pulled into the manhole (see FIG. 3).

The operator then descends into the manhole with the remote control box 33, adjusts the elevation of the frame so that foot 18 may brace the frame against the wall of the manhole, and adjusts the prop 16 to the proper length to suit the manhole. The operator then climbs out of the manhole and, by means of adjusting the position of the manhole opening brace 37 and by applying a downward pressure of the derrick and frame against chain 38, causes prop 16 and foot 18 to remain in alignment with the duct opening until the pulling forces are applied. The winch line 35 is then attached to a fish wire that has been previously placed in the duct and is drawn into the duct by an operator with a similar truck at the opposite end of the conduit section. The cable is then attached to the winch line 35 and pulled into the duct. Upon completion, the frame is extracted, folded over the truck and taken to its new work location.

It should be noted as shown in FIG. 3 that the winch line 35 does not wind itself around the shaft 10 even though the frame may be rotated to align with a duct opening and that the winch line pulley 26 is free to swing and rotate to align with the winch line 35 coming from the winch 34. The frame may be used to pull cable in ducts substantially running underneath the truck as shown in FIG. 3 or away from the truck as shown in FIG. 4. The only changes that need be made is a restringing of the winch line 35.

It will be obvious to those skilled in the art that various changes or alterations of the preferred embodiment shown in the various figures of the drawing can be made. These changes and alterations such as the type derrick, the means for fastening the frame in the manhole, are too numerous to enumerate and need not be because they are obvious and well within the scope of the invention disclosed above and the appended claims.

What is claimed is:

1. A frame for placing cable in underground conduit comprising: an extendable shaft having a sheave on one end and a yoke on the other, said yoke being triangular in shape and formed from two arms extending from the shaft in a Y shape and being joined at their extended ends by a bar, mounting means rotatably and pendulously attaching said frame to a support, and a pulley rotatably and pendulously attached to said frame by the same means attaching said frame to said support.

2. A frame according to claim 1 wherein fixing means are included upon the sheave end of the shaft, said means comprising an extendable prop journaled to said shaft upon the axle of said sheave and adapted to brace against a wall, thereby fixing the sheave end of the frame during operation.

3. The frame described in claim 1 wherein said support includes an axle and said means further comprises an eye bolt extending through an aperture in said bar and having the eye portion within the yoke arms, said aperture being large with respect to the bolt shaft diameter to allow rotation therebetween, a washer having a semicircular ring securely fastened thereto and secured to said shaft by securing means, said ring adapted to circumscribe said axle of said support, the diameter of said ring being sufficiently dissimilar to the diameter of said axle to allow the frame to swing like a pendulum with respect to said support.

4. A frame according to claim 3 wherein said pulley includes a U-shaped yoke having a loop extending through the eye of said bolt and attached to said U-shaped yoke.

5. A device for placing cable in underground conduit comprising a shaft having a sheave on one end and a yoke on the other, means for rotatably and pendulously mounting said device at the yoke end to a support so that said device may rotate with respect to said support about the axial center line of said shaft and swing with respect to said support, a pulley rotatably and pendulously mounted to said yoke by the same means mounting said device to said support so that said pulley is free to rotate and swing with respect to said yoke.

6. A device according to claim 5 wherein said device further includes means for fixing the sheave end of the shaft in a predetermined relationship with respect to said conduit.

7. The device of claim 6 wherein said yoke is triangular in shape, having a generally horizontal bar portion, said first mentioned means further comprising a journal member extending through an aperture in said portion, said portion and said member rotatably associated with each other, a mounting element connected to said member, said element adapted to rotate with respect to said member and to pendulously attach said device to said support.

8. The device described in claim 7 wherein said pulley is pendulously and rotatably mounted to said member.

9. A truck derrick mounted frame for pulling cable into underground conduit comprising an extendable tube section having a sheave on one end and a yoke on the other, means associated with the sheave end of said section for securing said frame in a predetermined relationship with respect to said conduit, mounting means rotatably attached to said yoke, said mounting means including a journal member and a ring portion, said portion adapted to pendulously mount said frame with respect to said derrick, and a pulley rotatably and pendulously mounted to said member.

10. A pulling frame according to claim 9 wherein said frame is adapted for use in a manhole having an opening and said first mentioned means comprises a first and a second chain and an anchor, said first chain associated with said anchor and said opening to prevent movement of said frame in a direction parallel to an axial line of said section, said second chain cooperating with said anchor and said manhole to prevent movement of said frame in a direction perpendicular to an axial line of said section.

11. The pulling frame described in claim 9 wherein said frame is adapted for use in a manhole having side walls and said first mentioned means comprises an extendable prop journaled to said section upon the axle of said sheave and adapted to brace against said wall and fix the sheave end of said frame during operation.

12. A frame according to claim 11 wherein said yoke is triangular, having two arms extending from said section in a Y shape and a bar closing the extended ends of the arms.

References Cited by the Examiner
UNITED STATES PATENTS

| | | | |
|---|---|---|---|
| 2,309,769 | 2/1943 | Hubbard | 254—139 X |
| 2,644,666 | 7/1953 | Johnson | 254—139 |
| 2,731,233 | 1/1956 | Lindsay | 254—134.3 |
| 2,858,946 | 11/1958 | Breed | 254—143 X |

FOREIGN PATENTS

| | | |
|---|---|---|
| 381,597 | 9/1923 | Germany. |

SAMUEL F. COLEMAN, *Primary Examiner.*